(12) United States Patent
Warner

(10) Patent No.: US 6,220,116 B1
(45) Date of Patent: Apr. 24, 2001

(54) ROTARY INDEXING TABLE

(76) Inventor: Michael V. Warner, 192 Angelina Street, Miss., Ontario (CA), L5T 1X4

(*) Notice: Subject to any disclaimer, the term of this patent is extended or adjusted under 35 U.S.C. 154(b) by 0 days.

(21) Appl. No.: 09/431,959

(22) Filed: Nov. 1, 1999

(51) Int. Cl.$^7$ .................................................. B23Q 16/06
(52) U.S. Cl. ........................... 74/813 C; 74/813 R; 74/52
(58) Field of Search ................................. 74/813 R, 84 R, 74/813 C, 813 L, 52, 816, 817, 821

(56) References Cited

U.S. PATENT DOCUMENTS

| | | |
|---|---|---|
| 4,202,221 * | 5/1980 | Thompson .............................. 74/821 |
| 4,377,953 | 3/1983 | Hagen . |
| 5,090,267 | 2/1992 | Gramling . |
| 5,159,846 | 11/1992 | Warner . |
| 5,481,944 | 1/1996 | Oketani et al. . |
| 5,540,120 | 7/1996 | Sommer . |
| 5,542,317 | 8/1996 | Carter et al. . |
| 5,682,658 | 11/1997 | Roseliep . |
| 5,860,332 | 1/1999 | Scholler . |

* cited by examiner

*Primary Examiner*—Mary Ann Green
(74) *Attorney, Agent, or Firm*—Marks & Clerk

(57) ABSTRACT

A rotary indexing table comprises a stationary gear mounted on a base, a rotary drive mounted within the base and carrying a first crank arm, and a planetary gear on the first crank arm engaging the stationary gear. A second crank arm is mounted on the planetary gear, and has a freely rotatable drive stub which engages and drives a radially directed force receiving member mounted on a rotatable table. The rotation axis of the freely rotatable drive stub overlies the circumference of the planetary gear; and as the planetary gear rotates, the drive stub is coupled to the force receiving member so as to freely move along it in a reciprocating manner. When the longitudinal axis of the first and second crank arms are aligned, the indexing table is locked in place and cannot be moved by an external force. One of the stationary gear and the planetary gear comprises a gear assembly having two identical gears, one of which is slightly rotationally offset with respect to the other, so that there is no backlash between the gears no matter which direction the planetary gear is rotating as it moves around the periphery of the stationary gear.

20 Claims, 8 Drawing Sheets

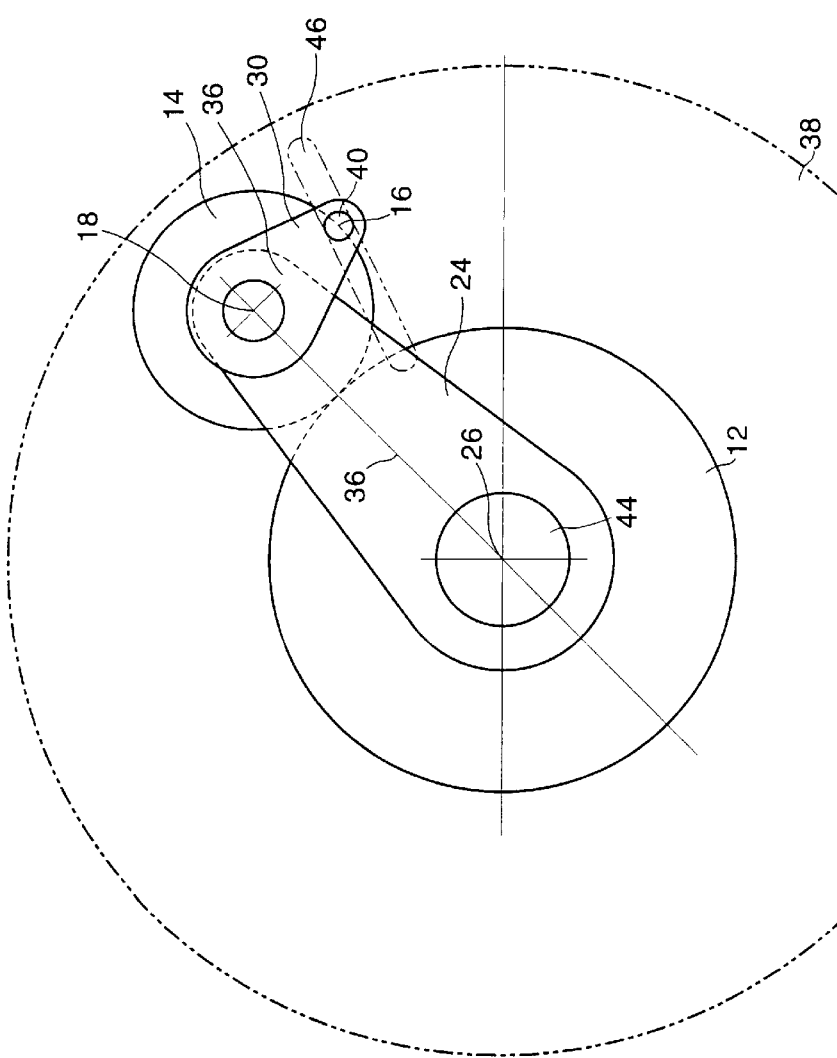
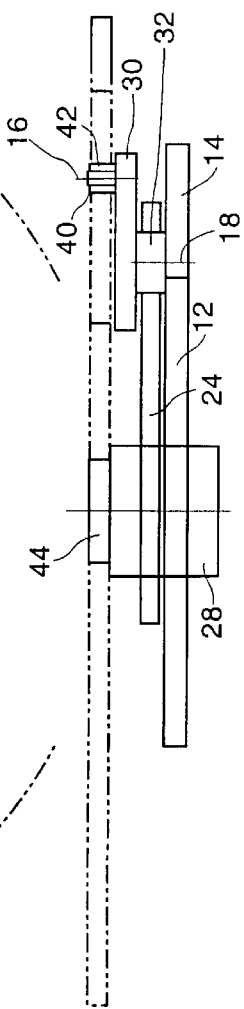
Figure 5
Figure 6

ROTARY INDEXING TABLE

FIELD OF THE INVENTION

This invention relates to rotary indexing tables in particular, and may find application in other fields where it is required to accurately drive a working element in rotational manner in a stop and start or reciprocating motion, with a high degree of repeatability. In particular, the present invention finds itself as a rotary indexing table of the sort which is used in many different manufacturing and commercial applications, particularly such as assembly plants employing robotics.

BACKGROUND OF THE INVENTION

Particularly in a robotics application, a rotary indexing table may be employed to move a workpiece between two or more index stations or indexing positions. A typical application might be, for example, a two-position indexing table where, at a first position, a workpiece is loaded and clamped onto the table, and at the second position the workpiece is worked on such as by having another element welded onto it in an accurately positioned manner. The indexing table then returns to the first position, where the first workpiece is removed and a second workpiece is placed on the table. Clearly, such operations are capable of being highly automated, but the automation is contingent upon the workpiece being accurately in place at all times. This requirement, in turn, leads to the necessity for rotary indexing tables to have very high degrees of repeatability as they move from one indexing position to the next.

Indeed, typical robotics used in manufacturing processes may require positioning of a workpiece with an accuracy in the order of tenths of a millimeter.

Still further, indexing tables should be capable of moving from one indexing position to the next quite rapidly. The time taken for moving a workpiece from one indexing position to another is non-productive time. However, the action of moving a workpiece from one station to another, by rotating a rotary indexing table from one indexing position to the next, must not be jerky in any manner. In other words, the motion from one indexing position to the next must require a smooth acceleration and deceleration, but as quickly as possible.

Typically, rotary indexing tables will have only two or three indexing positions, but the present invention contemplates that a rotary indexing table may have more indexing positions, because the precise number of indexing positions is immaterial to the invention.

However, typically a rotary indexing table will have two indexing positions, and the motion of the rotary indexing table is reciprocal. That is, the indexing table will rotate clockwise when moving from the first rotary indexing position to the second rotary indexing position, and counterclockwise when returning from the second indexing position to the first indexing position, or vice versa. Such motion permits the wiring, welding leads, compressed air lines, and the like for any robotics equipment which is mounted on the rotary indexing table to move between the first and second indexing positions without becoming unduly tangled.

Another matter of concern, particularly with indexing tables which employ a reciprocating motion, is the matter of backlash. Typically, as intermeshed gears change the direction of relative rotation one with respect to the other, there will be backlash as the mating sides of the intermeshed gears are replaced by the opposite sides of the respective gear teeth; the clearance between the gear teeth of intermeshed gears being required so as to preclude binding and undue wear. As will be noted hereafter, the problem of backlash is overcome by the present invention.

A further problem with rotary indexing tables is the manner in which they are locked in place as they attain and stop their respective indexing positions. Often times, external brakes are required for those purposes; but there is no necessity for any external braking devices in keeping with the present invention, as will be noted hereafter.

DESCRIPTION OF THE PRIOR ART

HAGEN U.S. Pat. No. 4,377,953, issued Mar. 29, 1983, teaches an indexing apparatus which is intended to move a workpiece from various operating stations in a smooth and jerk-free motion. Suitably arranged cams and cam followers are employed to convert the driving motion into either linear or rotary indexing motion in substantially jerk-free manner, with smooth acceleration and deceleration. This is accomplished by the crank arm having cam followers which control the pivotal movement of a transfer arm which is, in turn, connected to a linearly reciprocal apparatus, or to a reciprocable work supporting surface. However, employment of crank arms having cam followers and acting on cam surfaces typically results in there being substantial looseness or play in the apparatus, so that accurate positioning of a workpiece at differing indexing positions may not be attainable.

GRAMLING U.S. Pat. No. 5,090,267, issued Feb. 25, 1992, teaches an indexing apparatus whose principal concern is to avoid backlash. Here, a pinion is operatively connected to a shaft for rotating an indexing table, and is rotated to a preset angular position by first and second drive gears, each of which are in engagement with the pinion. Those drive gears are worm gears. One of the drive gears is rotated relative to the other gear in a predetermined direction and will rotate the pinion, if necessary, into contact with the other drive gear so as to remove backlash from the apparatus. It is stated that the biassing action comes as a result of a phase shift carried out between the first and second drive gears such that one of the gears is rotated relative to the other drive gear.

U. S. Pat. 5,159,846, issued Nov. 3, 1992 to WARNER teaches an indexing table which employs a stationary gear and two planetary gears mounted opposite each other. There is no looseness between the planetary gears and the stationary gear when the table is in an indexing position, so that no externally induced movement of the indexing table would be allowed at each indexing position. This is attained by having the first side of the gear teeth on one planetary gear being kept in continual contact with the first side of the gear teeth on the main gear, and the second side of the gear teeth on the second gear being kept in continual contact with the second side of the gear teeth on the main gear, when the table is at or near each indexing position. There is no looseness due to gear backlash while the indexing table is at or near each indexing position, and the table may be driven in either of two directions. However, there is looseness when the table is moving from one indexing position to another, and the indexing table requires a complicated double planetary gear arrangement.

OKETANI et al U.S. Pat. No. 5,481,944 issued Jan. 9, 1996 teach an indexing device having an indexing table mounted on a table shaft. There is an indexing gear fixed coaxially to the indexing table. A rotation correction device is provided for stopping the rotation of a worm shaft prior to the indexing operation of the indexing table, and there is a positioning device which operates after the worm shaft has been stopped, to impart a rotational torque to the indexing table. This causes a gear tooth face on the indexing gear to press against a worm tooth face on the worm gear, so that precise positioning of the indexing table occurs.

SOMMER U.S. Pat. No. 5,540,120, issued Jul. 30, 1996, teaches an indexing table which uses an oil shear brake and clutch to provide an accurate and reliable indexing table. This requires a two-speed oil shear drive system for high speed indexing and low speed final positioning. After the oil shear brake stops the table at an approximate final position, the final positioning system rotates and locks the indexing table at the correct position. The driving arrangement calls for a pinion having a very small number of teeth compared to the number of teeth on a main gear affixed to the table; but limit switches stop rotation of the table near each indexing position to permit the final positioning system employing an oil shear brake and clutch technology to take over.

CARTER et al U.S. Pat. No. 5,542,317, issued Aug. 6, 1996, teaches a rotary index table having an air bearing. The annular positioning mechanism includes a base mounted crown gear and a table mounted crown gear, together with a movable crown gear that is moved out of engagement with the base and table mounted crown gears to permit indexing rotation. Afterwards, the movable crown gear is moved back into engagement with the base and table mounted crown gears so as to locate the table with respect to the base while the air bearing supports the table on the base. Accurate positioning of the rotary indexing table is thus attained.

U.S. Pat. No. 5,682,658 issued Nov. 4, 1997 to ROSE-LIEP shares much the same disclosure as the CARTER et al patent, but with a different lift mechanism.

SCHOLLER U.S. Pat. No. 5,860,332, issued Jan. 19, 1999, also employs crown gears, where the third crown gear can be taken out of and into engagement with the other annular crown gears which are mounted on the indexing table and on a housing, respectively. Here, a hydraulically operable lifting and lowering device is employed.

SUMMARY OF THE INVENTION

In its broadest terms, the present invention provides a rotary indexing table having a stationary base with a first stationary gear assembly mounted thereon. The stationary base has a central longitudinal axis. A rotary drive means is provided having an axis of rotation which is coincident with the central longitudinal axis; and a first crank arm is mounted on the rotary drive means for rotational movement therewith.

A second planetary gear assembly is rotatably mounted on the first crank arm so as to be driven thereby around the periphery of the first stationary gear assembly. Each of the first stationary gear assembly and the second planetary gear assembly have complimentary gear teeth for meshing relationship with one another.

A second crank arm is mounted on the secondary planetary gear assembly for rotational movement therewith; and there is a freely rotatable drive stub mounted on the second crank arm.

A rotatable table is mounted for rotation about an axis of rotation which is coincident with the central longitudinal axis of the stationary base. The rotatable table is provided with a radially directed force receiving member which is found at one side of the rotatable table.

The freely rotatable drive stub on the second crank arm is coupled to the radially directed force receiving member on the rotatable table, in force transmitting relationship therewith. Thus, driving force is transmitted from the freely rotatable drive stub to the force receiving member, so as to cause rotational movement of the rotatable table.

The drive stub is coupled to the radially directed force receiving member so as to be freely moveable along the force receiving member as driving force is transmitted from the drive stub to the force receiving member during rotational movement of the rotatable table. That coupling between the drive stub and the force receiving member is such that, whenever drive force is being transmitted to the force receiving member from the freely rotatable drive stub, the direction of force transmission is perpendicular to the force receiving member.

One or other of the first stationary gear assembly and the secondary planetary gear assembly comprises a pair of identical gears; and the other of the first stationary gear assembly and the second planetary gear assembly comprises a single gear. One of the pair of identical gears is rotated and secured in place with respect to the other of the pair of identical gears in such a manner that the gear teeth on that first of the pair of identical gears are offset with respect to the gear teeth on the other of the pair of identical gears. Thus, the gear teeth on the first of the pair of identical gears contact one side of the gear teeth on the single gear at the point of contact between the pair of identical gears and the single gear, and the gear teeth on the other of the pair of identical gears contact the other side of the gear teeth on the single gear at that same point of contact therebetween.

In a first, preferred, embodiment of the present invention, it is the first stationary gear which comprises a pair of identical gears which are mounted to the stationary base so that one of the pair of identical gears is rotated the secured in place with respect to the other, and so that the gear teeth on that first one of the pair of identical gears are offset with respect to the gear teeth on the other of the pair of identical gears.

In an alternative embodiment of the present invention, it is the second planetary gear assembly which comprises a pair of identical gears. Once again, one of the pair of identical gears is rotated and secured in place with respect to the other of the pair of identical gears, in such a manner that the gear teeth on that first one of the pair of identical gears are offset with respect to the gear teeth on the other of the pair of identical gears. The gear teeth on the first one of the pair of identical gears contact one side of the gear teeth on the first stationary gear at the point of contact between the second planetary gear assembly and the first stationary gear, and the gear teeth of the other of the pair of identical gears contact the other side of the gear teeth on the first stationary gear at the point of contact therebetween.

In any embodiment of the present invention, the rotary drive means is driven by a motor which is under control of switch means which are located so as to turn the motor on and off when the radially directed drive force receiving member on the rotatable table assumes any one of at least two precisely defined indexing positions. Thus, the switch means controls the stopping and starting of rotational movement of the rotatable table at the at least two precisely defined indexing positions.

The present invention contemplates that there may be n precisely defined indexing positions, where n is an integer which is greater than 1 and less than 10. Moreover, the ratio of diameters, and the ratio of the numbers of gear teeth, of the first stationary gear assembly to the planetary gear, is n: 1. Typically, n is two; that is, there are two precisely defined indexing positions, there are twice as many gear teeth on the stationary gear assembly as on the planetary gear assembly, and the diameter of the stationary gear assembly is twice that of the planetary gear assembly.

Each of the first and second crank arms has a longitudinal axis. The longitudinal axis of the first crank arm extends between the axis of rotation of the rotary drive means and the axis of rotation of the rotatably mounted planetary gear. The longitudinal axis of the second crank arm extends between the axis of rotation of the rotatably mounted planetary gear, and the axis of rotation of the freely rotatable drive stub.

In keeping with a further provision of the present invention, the distance between the axis of rotation of the rotary drive means and the axis of rotation of the rotatably mounted planetary gear, along the longitudinal axis of the first crank arm, is the sum of the radiuses of the stationary gear assembly and the planetary gear when the teeth on one of the gears are meshed with the teeth on the other of the gears. Also, the distance between the axis of rotation of the rotatably mounted planetary gear and the axis of rotation of the freely rotatable drive stub, along the longitudinal axis of the second crank arm, is equal to the radius of the planetary gear when the teeth thereon are meshed with the teeth on the first stationary gear assembly.

In the above circumstances, when the longitudinal axis of the first and second crank arms are in alignment one with the other, then the axis of rotation of the freely rotatable drive stub overlies the point of contact between the stationary gear assembly and the planetary gear. In that condition, the intermeshed first stationary gear assembly and the second planetary gear are locked in place so as to lock the rotatable table in place, in the absence of a driving force being imparted by the rotary drive means to the first crank arm.

Obviously, where there are n precisely defined indexing positions, each of those n precisely defined indexing positions occurs when the longitudinal axes of the first and second crank arms are in alignment one with the other.

The driving relationship between the radially directed force receiving member and the freely rotatable drive stub may have different configurations. One configuration is such that the radially directed force receiving member on the rotatable table is a slot, and the freely rotatable drive stub is coupled thereto by being inserted therein. Thus, driving force is transmitted from the freely rotatable drive stub to the slot so as to cause rotational movement of the rotatable table.

In another embodiment, the radially directed force receiving member may be a beam which depends from the rotatable table; and a yoke member is mounted on the beam member so as to be freely slidable therealong. The freely rotatable drive stub is then coupled to the yoke member by being inserted into a socket in the yoke member so as to be freely rotatable therein, and so the driving force is transmitted from the freely rotatable drive stub through the yoke member to the beam member, so as to cause rotational movement of the rotatable table. Typically, the yoke member is mounted on the beam member so as to be freely slidable therealong, without looseness.

In yet another embodiment of the coupling between the radially directed force receiving member and the freely rotatable drive stub, a block member is mounted in a slot which is formed in the rotatable table, and which is the radially directed force receiving member thereof. The block member is freely slidable in the slot; and the freely rotatable drive stub is coupled to the block member by being inserted into a socket in the block member so as to be freely rotatable therein. Once again, driving force is transmitted from the freely rotatable drive stub through the block member to the slot, so as to cause rotational movement of the rotatable table. Once again, the block member is mounted in the slot so as to be freely slidable therein, without looseness.

Typically, and especially when there are two precisely defined indexing positions, the rotational movement of the rotatable table between those two precisely defined indexing position is a reciprocating motion.

The rotatable table is generally adapted to carry at least one workpiece between the precisely defined indexing positions, so that work can be performed on that workpiece at least at one of the precisely defined indexing positions. For example, as discussed above, when there are two indexing positions, the workpiece will be placed on or removed from the indexing table at the first indexing position, and will be worked on at the second indexing position.

The manner in which the stationary gear assembly, when it comprises a pair of identical gears, is mounted to the stationary base and the pair of identical gears are secured to each other, is by a plurality of bolts which extend between the stationary base and the one of the pair of identical gears which is furthermost from the stationary base.

Typically, the rotary indexing table may be circular; equally typically, the rotary indexing table may be square or rectangular.

When the distance between the axis of rotation of the rotatably mounted planetary gear and the axis of rotation of the freely rotatable drive stub along the longitudinal axis of the second crank arm, is equal to the radius of the planetary gear when the teeth on the planetary gear are meshed with the teeth on the stationary gear, then, for each rotation of the planetary gear through 360°, the locus described by the motion of the axis of rotation of the freely rotatable drive stub is an epicycloid.

An object of the present invention is to provide an indexing table which, when it assumes any of its precisely defined indexing positions, is locked in place so that external forces directed against the indexing table will not cause any movement thereof The only way that rotational movement of the rotary indexing table can be effected is for a driving force to be transmitted from the drive means to the first crank arm, and thence to the planetary gear and its associated second crank arm, and thence from the freely rotatable drive stub on the second crank arm to the radially directed force receiving member on the rotary indexing table.

Another object of the present invention is to provide an indexing table where there is no looseness or backlash between the stationary gear and the planetary gear, at any position of the planetary gear with respect to the stationary gear.

A further object of the present invention is to provide an indexing table which is compact in its structure, which may be readily and easily manufactured and assembled quite economically, and which will maintain its indexing position accuracy almost indefinitely.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 5 is a view similar to FIG. 3, but with the planetary gear and its associated crank arm having assumed a different position than that shown in FIG. 3;

FIG. 6 is a side elevation of FIG. 5;

DETAILED DESCRIPTION OF THE PREFERRED EMBODIMENTS

Reference will now be made to FIGS. 1 through 13.

First, however, it is first important to discuss the geometry and theory behind the gearing arrangement of the present invention, particularly as it relates to the manner in which driving force may be imparted to a rotary indexing table, and by which the rotary indexing table may be locked in position so that no external force directed against the rotary indexing table will cause any movement thereof. For those purposes, reference is made particularly to FIGS. 2, 3, 4, 5, and 6.

As noted above, FIGS. 2 to 6 are intended for purposes of illustration of the geometry and operating principles of the driving mechanism by which a rotary indexing table may be precisely driven using a stationary gear and a single planetary gear. However, for ease of illustration and discussion, the gear teeth have been omitted in each of FIGS. 2 to 6.

Moreover, the present discussion is directed to a geometry where there are two indexing positions. Therefore, the diameter of the stationary gear is precisely twice that of the planetary gear; and there are twice as many teeth on the stationary gear as there are on the planetary gear. It will be obvious to those skilled in the art that other geometries may be employed, whereby there may be three or four, or more, indexing positions. In such instances, the diameter of the planetary gear with respect to the stationary gear, and the number of teeth on the planetary gear with respect to the number teeth on the stationary gear may be one-third or one-quarter, and so on.

With reference to FIGS. 2 to 6, a stationary gear 12 and a planetary gear 14, are shown. A point 16 is assumed on the circumference of the planetary gear 14. The planetary gear rotates about an axis of rotation which is shown at 18.

Figure 2:
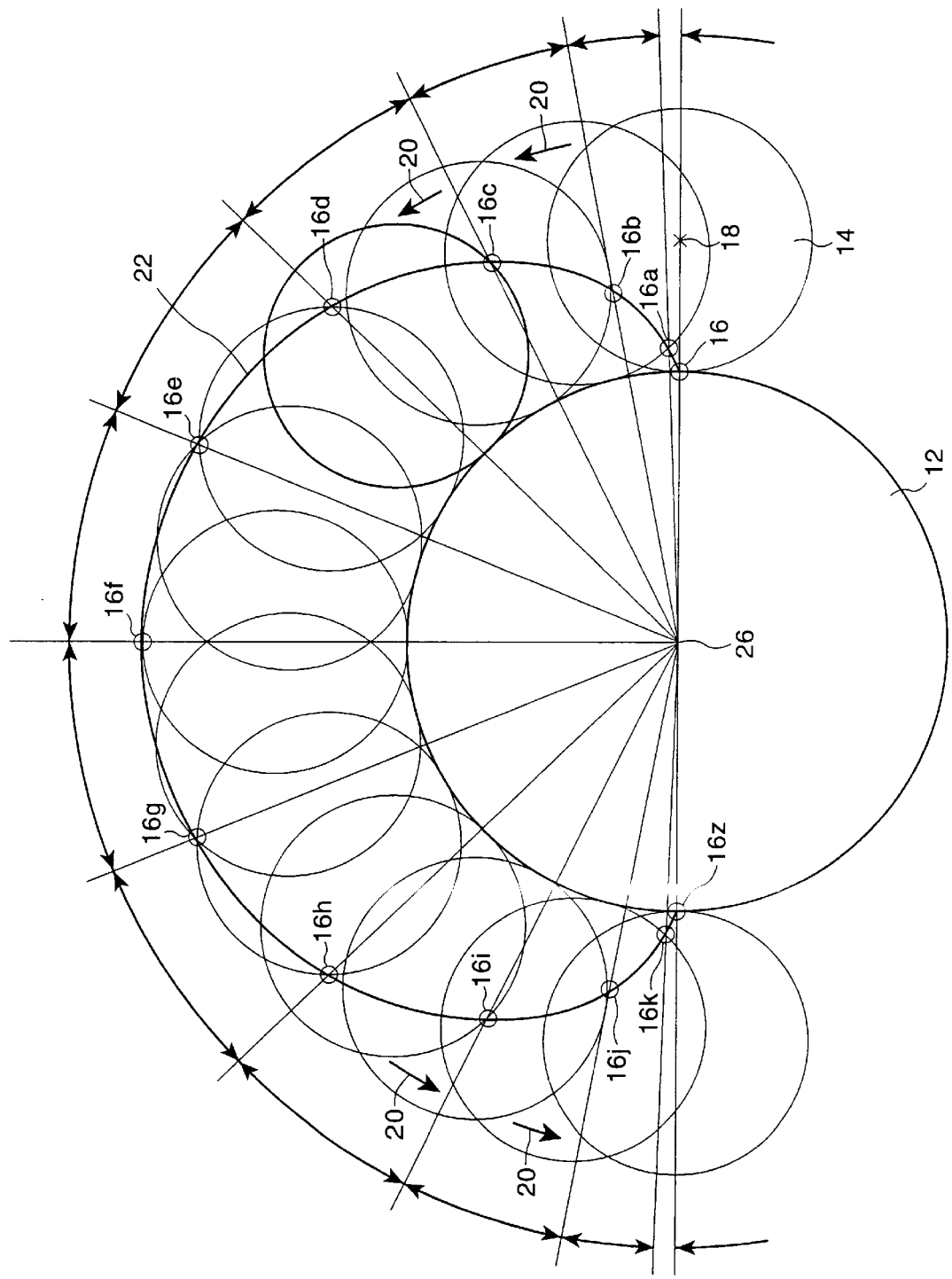
FIG. 2 shows the generation of an epicycloid curve by a planetary gear as it moves around a stationary gear, and shows the effects of acceleration and deceleration of the planetary gear, with the gear teeth being removed for ease of illustration.

If the planetary gear 14 moves around the stationary gear 12, without slipping, then the progression of point 16 is seen in FIG. 2. The planetary gear 14 rotates, for purposes of the present discussion, in a counterclockwise direction as shown by arrows 20; and as the planetary gear 14 rotates, and moves about the stationary gear 12 without slipping, the point 16 moves from its initial position to positions 16a, 16b, 16c, and so on, upon to 16j, 16k . . . , 16z. The locus of point 16, as it moves in the manner shown in FIG. 2, describes curve 22, which is an epicycloid.

It must be assumed, of course, that the planetary gear 14 is constrained to the stationary gear 12 by means of a crank arm 24, as shown in FIGS. 3 to 6, and elsewhere. The crank arm 24 is made to rotate about its axis of rotation 26 by means of a drive shaft or other drive means, shown generally at 28.

Of course, it will be understood that the planetary gear 14 is free to rotate about its axis of rotation 18. It will also be understood that there is a second crank arm 30 which is mounted to the planetary gear 14, such as by shaft 32, and the second crank arm 30 moves rotationally with the planetary gear 14, so that point 16 is always located near the end of the second crank arm 30 and over the circumference of the planetary gear 14.

The first crank arm 24 has a longitudinal axis 34, which extends between the axis of rotation 26 of the drive means 28, and the axis of rotation 18 of the planetary gear 14. The second crank arm 30 has a longitudinal axis 36, which extends between the axis of rotation 18 of the planetary gear 14, and the point 16—for purposes of the present discussion.

Figure 3:
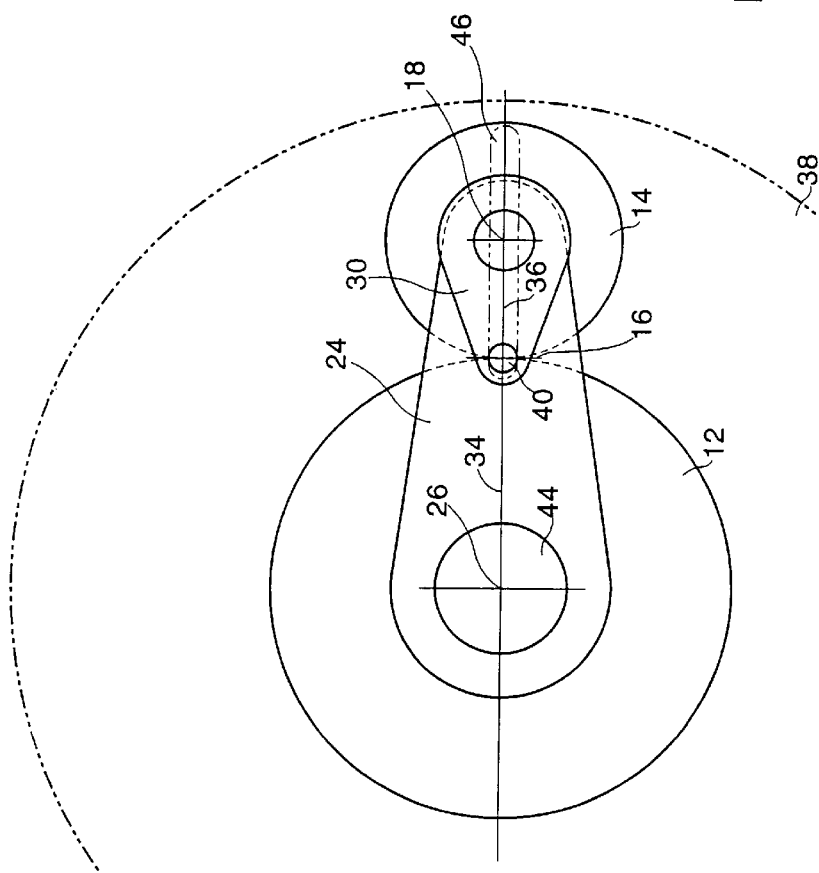
FIG. 3 is a partial plan view of the stationary and planetary gears and associated crank arms of the present invention, with the gear teeth having been removed for ease of illustration.

It will be evident upon inspection of FIG. 3, that when the longitudinal axes 34 and 36 of the first and second crank arms 24 and 30, respectively, are aligned as shown in FIG. 3, and so that point 16 is located as shown so as to be coincident with the co-alignment of longitudinal axes 34 and 36, then an external force exerted against point 16 will have no effect on causing the planetary gear 14 to rotate. It will be impossible. Thus, if the planetary gear 14 cannot be rotated, then the first and second crank arms 24 and 30 cannot be rotated, and thus a rotary table 38 cannot be rotated. In other words, an external force directed at the table 38, or the second crank arm 30, or even against the first crank arm 24 other than from the drive means 28, will not cause motion of the assembly. That effect requires, however, that there shall be no slippage between the stationary gear 12 and the planetary gear 14, and that condition is accomplished as described hereafter.

A freely rotatable drive stub 40 is mounted on the second crank arm 30, and it has an axis of rotation 42 which is coincident with point 16, as discussed above. The freely rotatable drive stub 40 is mounted on an axle or other means, and is free to rotate about its axis 42.

The plate 38 is mounted so that it freely rotates about a shaft 44, which is secured to the first crank arm 24 and the drive shaft 28.

For purposes of the present discussion, it will be assumed that a slot 46 is formed in the rotatable table 38, and the freely rotatable drive stub 40 is inserted into the slot 46.

Figure 4:
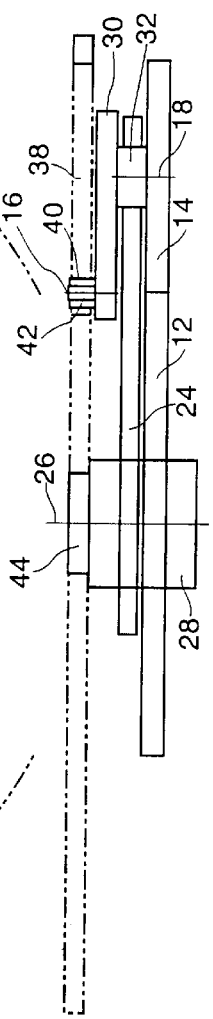
FIG. 4 is a side elevation view of FIG. 3.

Once again, it will be seen that, provided there is no slippage between the stationary gear 12 and the planetary gear 14, and provided there is no looseness between the freely rotatable drive stub 40 and the slot 46, when the assembly is in the alignment as shown in FIGS. 3 and 4, the table 38 is locked in position, and no amount of torque applied to the table 38 will move it out of position.

On the other hand, as soon as drive force is provided by the drive shaft 38 to the crank arm 24, so as to move the planetary gear 14 about its axis of rotation 18, and so as to move the second crank arm 30 about the same axis of rotation 18, then the freely rotatable stub 40 will start to slide along the slot 46—that is, it will rotate as it moves along the slot 46—and as it does there will be a driving force imparted from the freely rotatable drive stub 40 to the edge of the slot 46 at any instant in time, and that in turn will impart rotational movement to the table 38. Obviously, the direction in which the drive force is transmitted from the freely rotatable drive stub 40 to the slot 46 is perpendicular to the slot 46—that is, perpendicular to the straight parallel sides of the slot 46.

Obviously, as the second crank arm 30 is caused to rotate due to the driving action of the first crank arm 24 against the planetary gear 14, causing it to rotate about the stationary gear 12, rotary movement of the table 38 will thus be attained and the freely rotatable drive stub 40 will move substantially along the length of the slot 46.

Referring now to FIG. 2, once again, it will be seen that smooth acceleration and deceleration of the angular displacement of the planetary gear 14 with respect to the stationary gear 12, and thus of the table 38, will be achieved. Each of points 16a, 16b, 16c . . . 16g, 16k, 16z is shown with the planetary gear 14 having been rotated through 30°. Thus, location 16f is 180° removed from location 16, with respect to the planetary gear 14 per se, in that it is on the opposite side of the planetary gear 14 from the stationary gear 12 than where it is at location 16 or at location 16z.

Accordingly, even though the planetary gear 14 is rotated at substantially constant speed, the angular displacement of the point 16 with respect to the longitudinal axis 26 of the stationary gear 12 as it travels around the stationary gear, is constantly changing. Thus, the angular displacement is very small—as from location 16 to location 16a—when rotation of the planetary gear 14 starts, and it increases significantly as the rotation progresses—as from location 16e to 16f, or location 16f to 16g. Obviously, the angular distances between the location points 16, 16a, 16b, etc., are indicative of the amount of acceleration and deceleration that point 16 undergoes, as it follows the epicycloid curve 22. Obviously, that acceleration and deceleration is constant, and smooth, when the planetary gear is rotated at a constant speed.

It follows from the above that any mechanism which employs the drive mechanism as described particularly with respect to FIGS. 3 to 6, based on the geometry of FIG. 2 where an epicycloid curve is employed, will be inherently self—locking at any indexing position when the longitudinal axes of the respective crank arms are in alignment one with the other. Moreover, there is inherent acceleration and deceleration, which is smooth, during rotational displacement of the rotary indexing table from one indexing position to another.

Turning now to FIGS. 7 to 13, some more specific discussion of the drive mechanism of the present invention will be described, with particular consideration of the manner by which backlash between the stationary gear and the planetary gear can be eliminated, no matter which direction of rotation the planetary gear is undergoing.

As discussed above, a basic premise upon which the present invention is based, is that there shall be no slippage between the planetary gear and the stationary gear.

However, in order for gears to operate, there must be clearance between the teeth of intermeshing gears. That clearance is the difference between the width of a tooth of one gear and the space between teeth of the meshing gear; and without clearance, the teeth will bind—precluding rotation—and wear.

The present invention accommodates both the clearance which is required between any set of gears intermeshing with another set of gears in driving relationship, while preventing looseness between the gears. This is achieved by having one of the gears being, in fact, a gear assembly of two identical gears—typically, each of which is half the thickness of the other mating gear. In a preferred embodiment of the present invention, it is the stationary gear which is the gear assembly of two identical gears; however, it will be evident that either the stationary gear or the planetary gear could be arranged so as to comprise a pair of identical gears, one of which is slightly rotationally shifted with respect to the other. The pair of identical gears are, of course, secured in place with respect to each other, so that once the rotational offset of the two identical gears with respect to each other has been established, it will be maintained.

Figure 7:
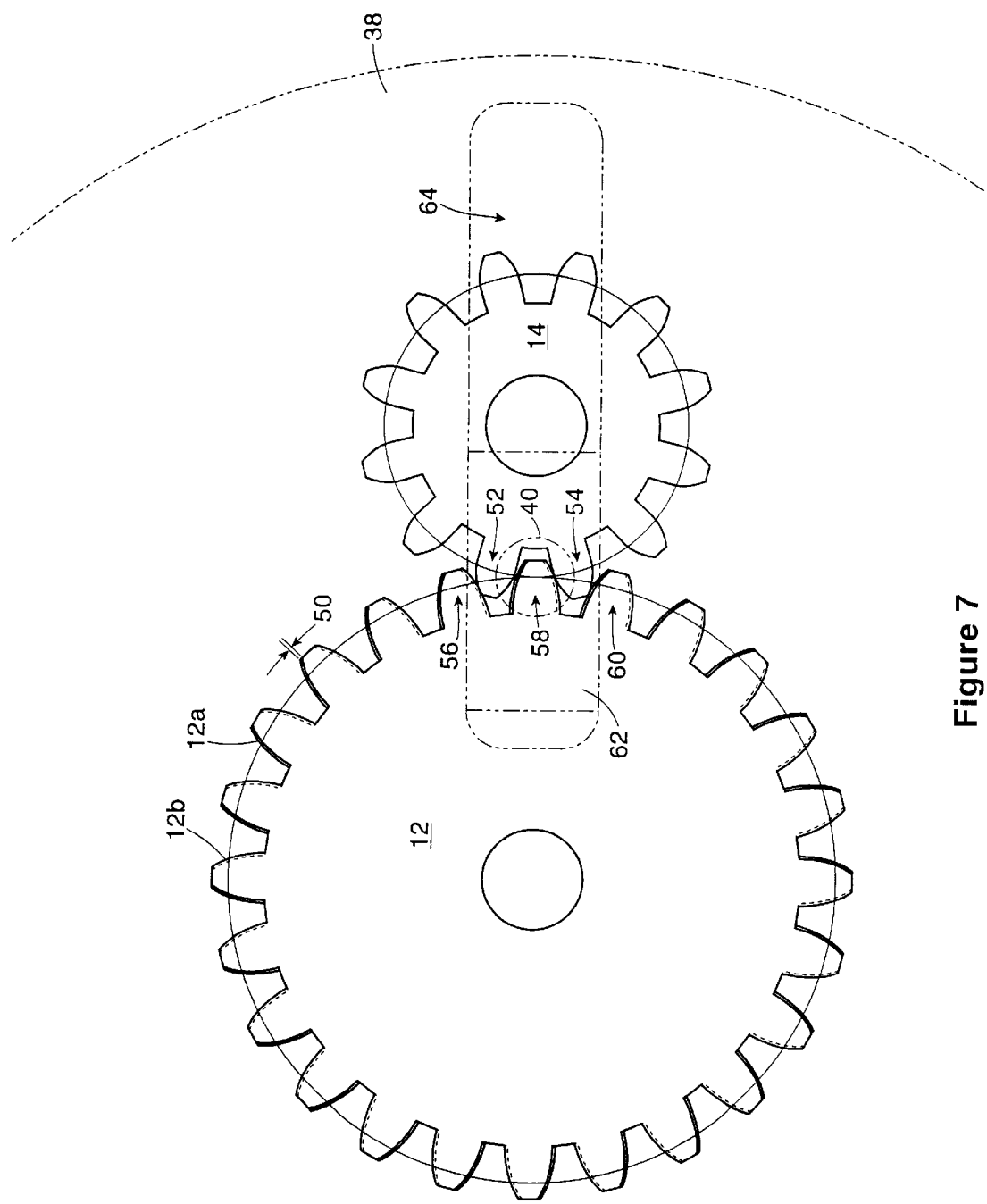
FIG. 7 is a partial plan view of a typical gear arrangement, where the stationary gear comprises a pair of identical gears which are offset rotationally one with respect to the other.
Figure 8:
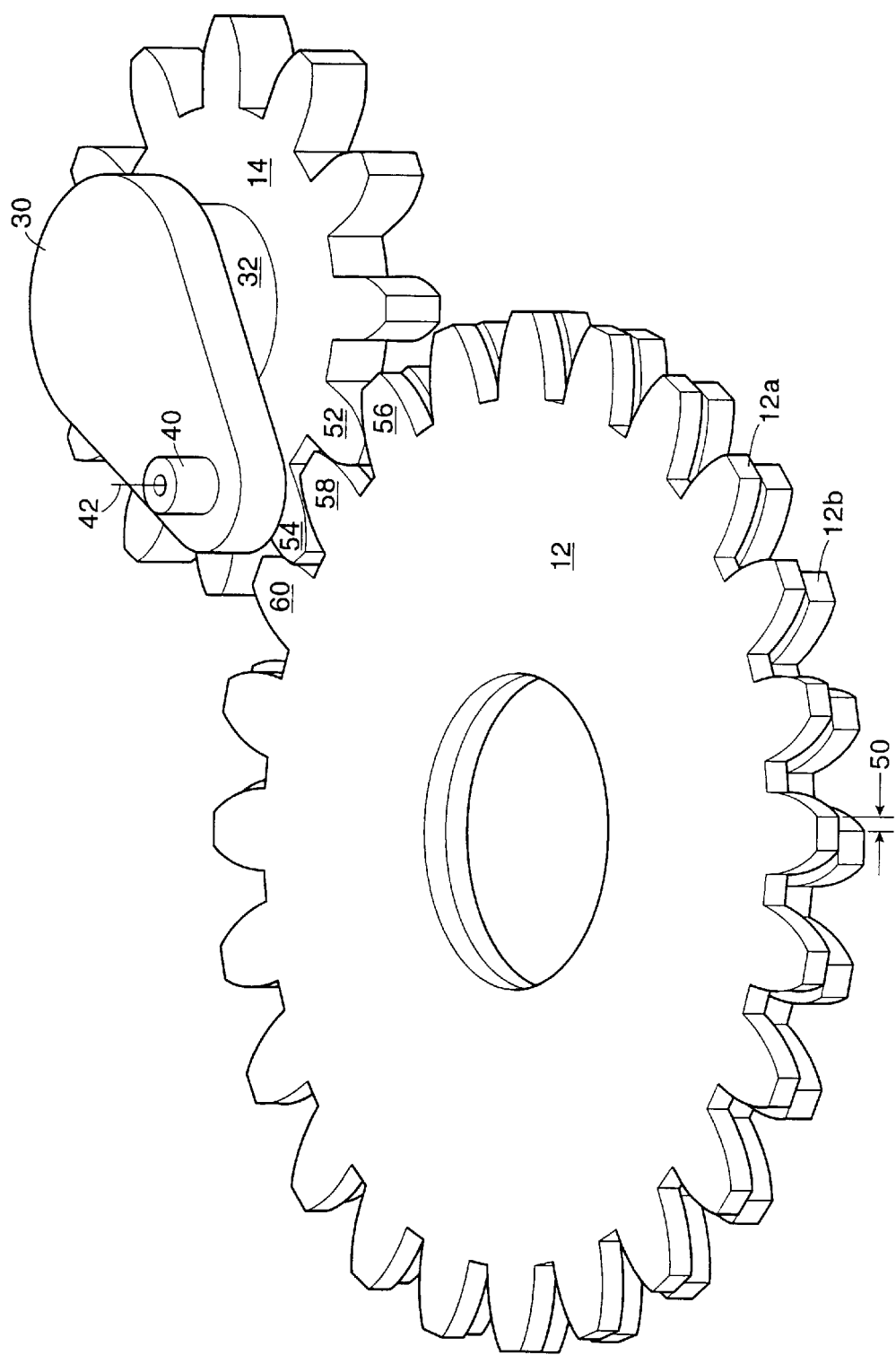
FIG. 8 is a perspective view of a stationary gear and planetary gear, with the second crank arm, and showing the stationary gear assembly comprising a pair of identical gears which are rotationally offset one with respect to the other.
Figure 9:
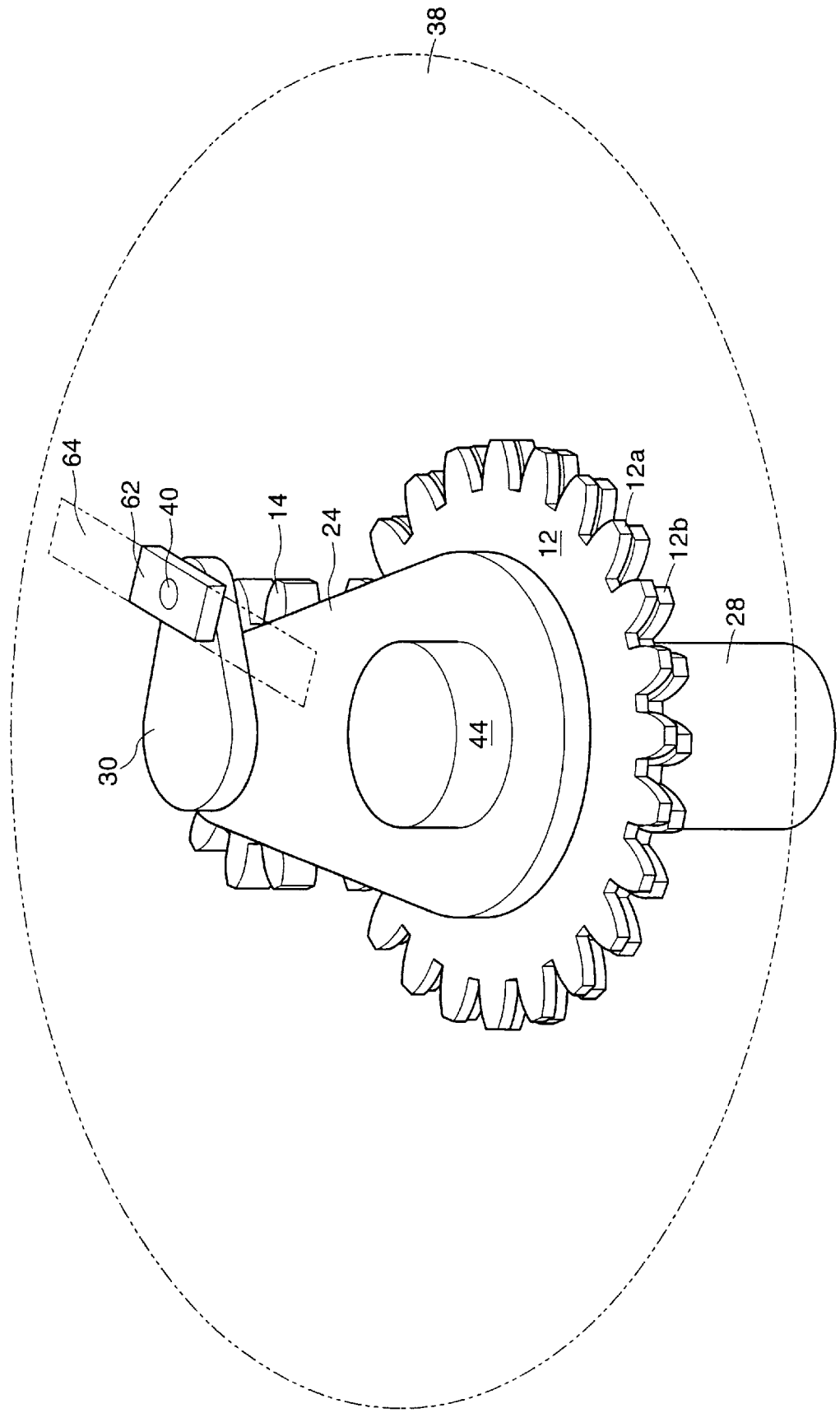
FIG. 9 is a perspective view showing a typical driving arrangement for effecting rotational movement of an indexing table, in keeping with the present invention.

FIGS. 7, 8, and 9, show a stationary gear 12 which comprises a pair of identical gears 12a and 12b which are rotationally offset one with respect to the other by an amount 50, shown in FIGS. 7 and 8. That is the amount by which the upper gear 12a has been rotated counterclockwise with respect to the lower gear 12b, as shown in FIG. 8; the view in FIG. 7 can be considered to be from beneath, so the gear components 12a and 12b appear with gear component 12b being offset clockwise with respect to gear component 12a.

In any event, as is clearly shown in each of FIGS. 7 and 8, teeth 52 and 54 on the planetary gear 14 mesh with teeth 56, 58, 60, on the stationary gear 12 in such a manner that one side of tooth 52 contacts one side of tooth 58 on gear component 12a, and the opposed side of tooth 52 contacts gear tooth 56 on gear component 12b. Likewise, gear tooth 54 contacts gear tooth 58 on the gear component 12b of the stationary gear 12, and the other side of the gear tooth 54 contacts tooth 60 on the gear component 12a of the stationary gear 12.

FIG. 7 also shows one of the alternative driving arrangements—the preferred alternative driving arrangement, embodying a so-called "Scotch Yoke" assembly—by which driving force is transmitted to the rotary table 38. The freely rotatable drive stub 40 is shown being inserted into a co-operating socket therefor, which is formed in a block member 62. The block member 62 is adapted to be freely slidable in a slot 64, without looseness. That is, there is no sideways movement of the block 62 within the slot 64; the width of the block 62 and the width of the slot 64 being substantially the same but with just enough adequate clearance for the sliding motion of the block 62 within the block 64. Of course, appropriate lubrication is provided.

FIG. 8 additionally shows the shaft 32 on which the second crank arm 30 is securely mounted for rotation with the planetary gear 14. Also shown in FIG. 8 is the freely rotatable drive stub 40 mounted on the planetary gear 14, for rotation about its axis of rotation 42. It has been discussed above that the axis of rotation 42 of the freely rotatable drive stub 40 is coincident with the point 16, which underlies it at the specific driving point between the stationary gear 12 and the planetary gear 14.

Reference is made briefly to FIG. 9, which shows a perspective but simplified view of the apparatus of FIG. 7, with the "Scotch Yoke" assembly 40, 62, 64 shown in place in association with the rotary table 38 and the second crank arm 30.

Referring now to FIGS. 10 through 13, it will be seen that as the first crank arm 24 is rotated counterclockwise, so too will the table 38 be rotated counterclockwise, but with an accelerating and decelerating motion. Thus, it will be seen in FIG. 11 that the slot 64 has rotated counterclockwise approximately 45° from the position shown in FIG. 10, whereas the first crank arm 24 has rotated through more than 45°. However, in FIG. 12, both the first crank arm 24, and the slot 64, have rotated through 90° with respect to the position shown in FIG. 10.

Figure 13:
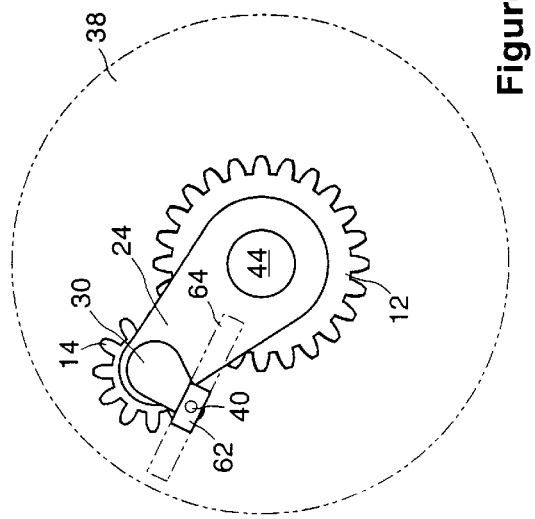
Figure 10:
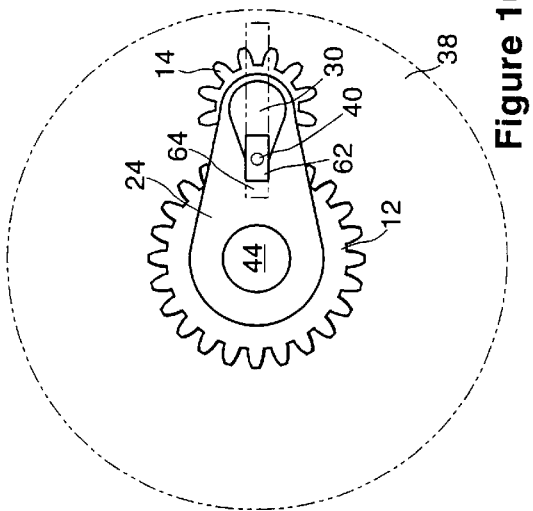

Now, having regard to FIG. 13, it will be seen that the slot 64 has rotated approximately 135° with respect to its position in FIG. 10, whereas the first crank arm 24 has rotated less than 135°.

Figure 11:
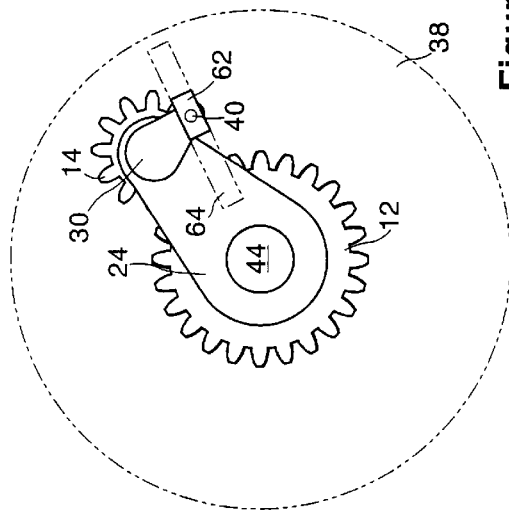
FIGS. 10, 11, 12, and 13 are plan views of the drive mechanism of FIG. 9, with the planetary gear being shown in four different locations with respect to the stationary gear.
Figure 12:
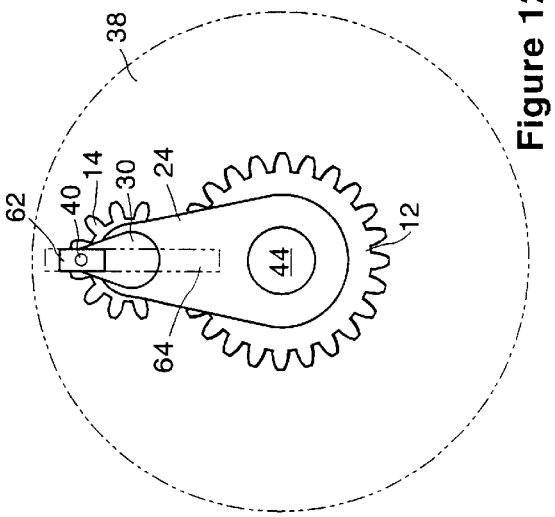

In like manner, it will be seen that the relative positions of the second crank arm 30, as shown in FIGS. 11, 12, and 13, with respect to the first crank arm 24, are approximately 90°, 180°, and 270° rotationally counterclockwise from the position shown in FIG. 10.

It will also be noted in FIG. 10 that the block 62 is near the inner end of the slot 64, it is substantially centrally located in the slot 64 in FIG. 11, and it is near the outer end of the slot 64 in FIG. 12. Then, in FIG. 13, the motion of the block 62 in the slot 64 has been reversed, and it has once again attained a substantially central position within the slot 64. Obviously, a second indexing position will be attained when the components shown in FIGS. 10 through 13 assume a position which is effectively the mirror position of that which is shown in FIG. 10; whereby the planetary gear 14 and the second crank arm 30 will have rotated through 360°, and the first crank arm will have rotated through 180°. The table 38 will also have rotated through 180°, having been driven by the driving relationship between the "Scotch Yoke" assembly 40, 62, 64, between the second crank arm 30 and the table 38.

Thus, the simple slot 46 which is shown in FIGS. 3 and 5 has been replaced in FIGS. 7 and 9 through 13 with the slot 64 and moving block 62, which together with the freely rotatable drive stub 40 comprise a "Scotch Yoke" assembly.

It is equally evident that the slot 46 shown in FIGS. 3 and 5 may be replaced with a beam member (not shown) on which a yoke member (not shown) may be placed, and into which the freely rotatable drive stub 40 may be inserted, with the same results as to the driving and rotational movement of the table 38.

Figure 1:
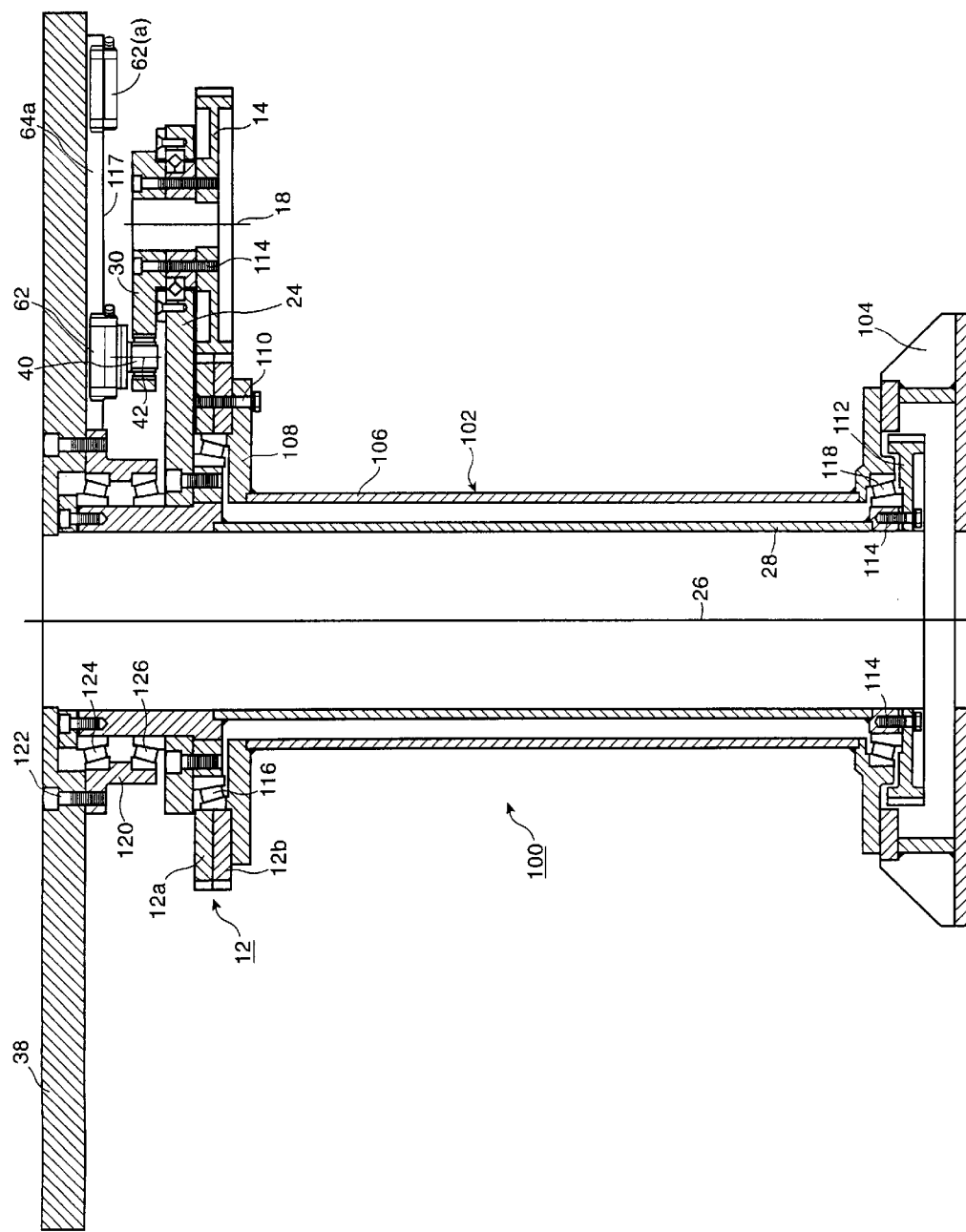
FIG. 1 is an elevational section of a typical rotary indexing table assembly, in keeping with the present invention.

Finally, having regard to FIG. 1, a typical assembly elevation of a typical rotary index table in keeping with the present invention, is shown. The operation of the rotary index table assembly of FIG. 1 will be evident from the above discussion with respect to FIGS. 2 through 13; the same reference numerals will be used in FIG. 1 as are used in FIGS. 2 through 13, wherever appropriate.

However, it will be noted that the rotary table 38 which is shown in FIG. 1 is not necessarily circular, but it may be, as shown by the chain lines outlining the table 38 in the other figures. As noted above, the table 38 is just as typically rectangular or square, than circular.

The assembly 100 of FIG. 1 includes a stationary base 102. The stationary base 102 typically comprises a pedestal 104, a pillar 106, and a base support frame 108. That stationary base assembly 102 is bolted or otherwise secured to a floor or other supporting structure.

The stationary gear assembly 12 is mounted on the stationary base assembly 102. The stationary gear assembly 12 typically comprises a pair of identical gears 12a and 12b, as discussed above; the gear members 12a and 12b are typically secured to the base support plate 108 by a plurality of bolts 110—which typically extend from the base plate 108 through a passageway formed in the gear element 12b and into a tapped hole formed in the gear element 12a. Indeed, the passageway formed in gear 12b is a slot, thereby permitting the rotational displacement of the gears 12a and 12b one with respect to the other. Once the rotational displacement of the gear elements 12a and 12b has been established, the plurality of bolts 110 are then tightened and secured.

The adjustment of the gear elements 12a and 12b with respect to each other is a relatively simple matter, once the assembly of the rotary index table assembly 100 has been substantially concluded, or at least so far that the stationary and planetary gears are in place together with their associated crank arms. Then, the gear element 12a is urged slightly rotationally with respect to the gear element 12b until there is no backlash between the gear teeth in the region where the gear teeth of the stationary gear assembly 12 and the planetary gear 14 are intermeshed.

The longitudinal axis 26 of the stationary base 102 and the stationary gear assembly 12, shown at 26, is also coincident with the axis of rotation of the rotary drive means 28. The rotary drive means 28 comprises a shaft which is driven from a gear 112 to which it is bolted by bolts 114. The gear 112 is, in turn, driven in the well known manner by an external motor (not shown).

Secured to the drive shaft 28 is the first crank arm 24. The crank arm 24 is, in turn, adapted to drive the planetary gear 14 about its axis of rotation 18. The second crank arm 30 is secured to the planetary gear 14 by bolts 114.

Suitable bearings 116 are provided to accommodate the rotational movement of the first crank arm 24 with respect to the stationary base assembly 102.

Likewise, suitable bearings 118 are provided to accommodate the rotational movement of the drive shaft 28 with respect to the stationary base assembly 102.

The first rotatable drive stub 40 is, of course, shown on the second crank arm 30. Also shown in FIG. 1 is the "Scotch Yoke" assembly, comprising the lock 62 which, in this case, is suspended below the table 38 in an additional assembly which includes the slot 64—one side of which is shown at 64a. Also shown in FIG. 1 is the block 62 in position 62(a), at the outer end of the slot 64.

It will also be understood, of course, that the slot assembly 117 might also be replaced by a beam member, and that the block 62 might be replaced by a yoke adapted to slide along the beam.

The table 38 is secured to its own shaft 120 by bolts 122, and the rotation of the table 38 with respect to the drive shaft 28—it will be recalled, for example, from FIGS. 9 through 13 that they will rotate at different speeds—is accommodated by bearings 124 and 126.

Otherwise, the operation of the rotary indexing table assembly 100 of FIG. 1 is as described above.

It should be emphasized, once again, that either of the stationary gear 12 or the planetary gear 14 may comprise a pair of identical gears which are rotated and secured in place one with respect to the other, in the manner described above. For ease of assembly, ease of adjustment, and because many more bolts 110 can be employed to secure the gear members 12a and 12b together to form the gear assembly 12, it is usual for the split gear arrangement to be assembled with respect to the stationary gear. However, the present invention is not limited thereto; nor are any of the specific comments made with respect to assembly or a rotary indexing table in keeping with the present invention intended to be restrictive, but they are merely exemplary.

As noted, the assembly which has been particularly described above is one which contemplates two precisely defined indexing positions, whereby the diameter of the stationary gear assembly 12 and the planetary gear assembly 14 are in the ratio of 2:1.

Obviously, as the planetary gear 14 assumes each indexing position, such as shown in FIG. 2 with the planetary gear 14 at either side of the stationary gear 12, a suitable switch means (not shown) will function so as to turn off the motor. Typically, a limit switch or a light beam activated switch will be positioned at or near each indexing position so that when the rotary index table approaches the indexing position, the switch is activated and the motor is stopped. Because of inertia, the switch may be slightly rotationally offset with respect to the indexing position per se. Likewise, the switch may be activated to begin motor operation by operator intervention, or often by software intervention—especially when the indexing table of the present invention is being employed in a robotic situation.

It should be noted that the present invention works equally well whether the indexing table is in a horizontal orientation or a vertical orientation. For example, most industrial indexing tables work with a horizontal disposition; but there may be other applications such as transfer machines and the like which require that the indexing table be vertical.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially the same length means essentially the same length or not significantly different in length.

What is claimed is:

1. A rotary indexing table, comprising:

a stationary base having a first stationary gear assembly mounted thereon, and having a central longitudinal axis;

a rotary drive means having an axis of rotation which is coincident with said central longitudinal axis;

a first crank arm mounted on said rotary drive means for rotational movement therewith;

a second planetary gear assembly rotatably mounted on said first crank arm so as to be driven thereby around the periphery of said first stationary gear assembly;

each of said first stationary gear assembly and said second planetary gear assembly having complimentary gear teeth for meshing relationship with one another;

a second crank arm mounted on said second planetary gear assembly for rotational movement therewith;

a freely rotatable drive stub mounted on said second crank arm; and a rotatable table mounted for rotation about an axis of rotation which is coincident with said central longitudinal axis, said rotatable table including a radially directed force receiving member at one side thereof;

wherein said freely rotatable drive stub is coupled to said radially directed force receiving member in force transmitting relationship therewith, whereby driving force is transmitted from said freely rotatable drive stub to said force receiving member so as to cause rotational movement of said rotatable table;

where said drive stub is coupled to said radially directed force receiving member so as to be freely moveable along said force receiving member as driving force is transmitted from said drive stub to said force receiving member during rotational movement of said rotatable table whereby, whenever drive force is being transmitted to said force receiving member, the direction of force transmission is perpendicular to said force receiving member;

wherein one of said first stationary gear assembly and said second planetary gear assembly comprises a pair of identical gears, and the other of said first stationary gear assembly and said second planetary gear assembly comprises a single gear;

wherein one of said pair of identical gears is rotated and secured in place with respect to the other of said pair of identical gears in such a manner that the gear teeth on said one of said pair of identical gears are offset with respect to the gear teeth on the other of said pair of identical gears; and wherein the gear teeth on said one of said pair of identical gears contact one side of the gear teeth on said single gear at the point of contact between said pair of identical gears and said single gear, and the gear teeth of the other of said pair of identical gears contact the other side of the gear teeth on said single gear at said point of contact therebetween.

2. A rotary indexing table, comprising:

a stationary base having a first stationary gear assembly mounted thereon, and having a central longitudinal axis;

a rotary drive means having an axis of rotation which is coincident with said central longitudinal axis;

a first crank arm mounted on said rotary drive means for rotational movement therewith;

a second planetary gear rotatably mounted on said first crank arm so as to be driven thereby around the periphery of said first stationary gear assembly;

each of said first stationary gear assembly and said second planetary gear having complimentary gear teeth for meshing relationship with one another;

a second crank arm mounted on said second planetary gear for rotational movement therewith;

a freely rotatable drive stub mounted on said second crank arm; and a rotatable table mounted for rotation about an axis of rotation which is coincident with said central longitudinal axis, said rotatable table including a radially directed force receiving member at one side thereof;

wherein said freely rotatable drive stub is coupled to said radially directed force receiving member in force transmitting relationship therewith, whereby driving force is transmitted from said freely rotatable drive stub to said force receiving member so as to cause rotational movement of said rotatable table;

where said drive stub is coupled to said radially directed force receiving member so as to be freely moveable along said force receiving member as driving force is transmitted from said drive stub to said force receiving member during rotational movement of said rotatable table whereby, whenever drive force is being transmitted to said force receiving member, the direction of force transmission is perpendicular to said force receiving member;

wherein said first stationary gear assembly comprises a pair of identical gears mounted to said stationary base so that one of said pair of identical gears is rotated and secured in place with respect to the other of said pair of identical gears in such a manner that the gear teeth on said one of said pair of identical gears are offset with respect to the gear teeth on the other of said pair of identical gears; and wherein the gear teeth on said one of said pair of identical gears contact one side of the gear teeth on said second planetary gear at the point of contact between said second planetary gear and said first stationary gear assembly, and the gear teeth of the other of said pair of identical gears contact the other side of the gear teeth on said second planetary gear at said point of contact therebetween.

3. The rotary indexing table of claim 2, wherein said rotary drive means is driven by a motor under control of switch means located so as to turn said motor on and off when said radially directed force receiving member on said rotatable table assumes any one of at least two precisely defined indexing positions, whereby said switch means controls the stopping and starting of rotational movement of said rotatable table at said at least two precisely defined indexing positions.

4. The rotary indexing table of claim 2, wherein there are n precisely defined indexing positions, where n is an integer greater than 1 and less than 10; and wherein the ratio of diameters, and of the numbers of gear teeth, of said first stationary gear assembly to said second planetary gear is n: 1.

5. The rotary indexing table of claim 4, where n=2.

6. The rotary indexing table of claim 2, wherein each of said first and second crank arms has a longitudinal axis;

wherein the longitudinal axis of said first crank arm extends between the axis of rotation of said rotary drive means and the axis of rotation of said rotatably mounted second planetary gear; and wherein the longitudinal axis of said second crank arm extends between the axis of rotation of said rotatably mounted second planetary gear and the axis of rotation of said freely rotatable drive stub.

7. The rotary indexing table of claim 6, wherein the distance between the axis of rotation of said rotary drive means and the axis of rotation of said rotatably mounted second planetary gear, along the longitudinal axis of said first crank arm, is the sum of the radiuses of said first stationary gear assembly and said second planetary gear when the teeth on one of said gears are meshed with the teeth of the other of said gears; and wherein the distance between the axis of rotation of said rotatably mounted second planetary gear and the axis of rotation of said freely rotatable drive stub, along the longitudinal axis of said second crank arm, is equal to the radius of said second planetary gear when the teeth thereon are meshed with the teeth on said first stationary gear assembly.

8. The rotary indexing table of claim 7, wherein, when said longitudinal axes of said first and second crank arms are in alignment one with the other, the axis of rotation of said freely rotatable drive stub overlies the point of contact between said first stationary gear assembly and said second planetary gear;

whereby said intermeshed first stationary gear assembly and second planetary gear are locked in place so as to lock said rotatable table in place, in the absence of a driving force being imparted by said rotary drive means to said first crank arm.

9. The rotary indexing table of claim 8, wherein there are n precisely defined indexing positions, where n is an integer greater than 1 and less than 10; and wherein each of said n precisely defined indexing positions occurs when said longitudinal axes of said first and second crank arms are in alignment one with the other.

10. The rotary indexing table of claim 2, wherein said radially directed force receiving member on said rotatable table is a slot, and said freely rotatable drive stub is coupled thereto by being inserted therein, so that driving force is transmitted from said freely rotatable drive stub to said slot so as to cause rotational movement of said rotatable table.

11. The rotary indexing table of claim 2, wherein said radially directed force receiving member on said rotatable table is a beam member depending therefrom, wherein a yoke member is mounted on said beam member so as to be freely slidable there along, and wherein said freely rotatable drive stub is coupled thereto be being inserted into a socket in said yoke member so as to be freely rotatable therein, so that driving force is transmitted from said freely rotatable drive stub through said yoke member to said beam member so as to cause rotational movement of said rotatable table.

12. The rotary indexing table of claim 11, wherein said yoke member is mounted on said beam member so as to be freely slidable there along without looseness.

13. The rotary indexing table of claim 2, wherein said radially directed force receiving member on said rotatable table is a slot having a block member mounted therein, so as to be freely slidable therein, and wherein said freely rotatable drive stub is coupled thereto by being inserted into a socket in said block member so as to be freely rotatable therein, so that driving force is transmitted from said freely rotatable drive stub through said block member to said slot so as to cause rotational movement of said rotatable table.

14. The rotary indexing table of claim 13, wherein said block member is mounted in said slot so as to be freely slidable therein without looseness.

15. The rotary indexing table of claim 5, wherein the rotational movement of said rotatable table between said two precisely defined indexing positions is a reciprocating motion.

16. The rotary indexing table of claim 3, wherein said rotatable table is adapted to carry at least one workpiece between said at least two precisely defined indexing positions so that work can be performed on the at least one workpiece at at least one of said at least two precisely defined indexing positions.

17. The rotary indexing table of claim 2, wherein said pair of identical gears are secured to each other and to said stationary base by a plurality of bolts extending between said stationary base and the one of said pair of identical gears which is furthermost from said stationary base.

18. The rotary indexing table of claim 2, wherein the distance between the axis of rotation of said rotatably mounted second planetary gear and the axis of rotation of said freely rotatable drive stub along a longitudinal axis of said second crank arm, is equal to the radius of said second planetary gear when the teeth thereon are meshed with the teeth on said first stationary gear assembly;

whereby, for each rotation of said second planetary gear through 360°, the locus described by the motion of said axis of rotation of said freely rotatable drive stub is an epicycloid.

19. The rotary indexing table of claim 2, wherein said rotatable table is circular.

20. A rotary indexing table, comprising:

a stationary base having a first stationary gear mounted thereon, and having a central longitudinal axis;

a rotary drive means having an axis of rotation which is coincident with said central longitudinal axis;

a first crank arm mounted on said rotary drive means for rotational movement therewith;

a second planetary gear assembly rotatably mounted on said first crank arm so as to be driven thereby around the periphery of said first stationary gear assembly;

each of said first stationary gear and said second planetary gear assembly having complimentary gear teeth for meshing relationship with one another;

a second crank arm mounted on said second planetary gear for rotational movement therewith;

a freely rotatable drive stub mounted on said second crank arm; and a rotatable table mounted for rotation about an axis of rotation which is coincident with said central longitudinal axis, said rotatable table including a radially directed force receiving member at one side thereof, wherein said freely rotatable drive stub is coupled to said radially directed force receiving member in force transmitting relationship therewith, whereby driving force is transmitted from said freely rotatable drive stub to said force receiving member so as to cause rotational movement of said rotatable table;

where said drive stub is coupled to said radially directed force receiving member so as to be freely moveable along said force receiving member as driving force is transmitted from said drive stub to said force receiving member during rotational movement of said rotatable table whereby, whenever drive force is being transmitted to said force receiving member, the direction of force transmission is perpendicular to said force receiving member;

wherein said second planetary gear assembly comprises a pair of identical gears, and wherein one of said pair of identical gears is rotated and secured in place with respect to the other of said pair of identical gears in such a manner that the gear teeth on said one of said pair of identical gears are offset with respect to the gear teeth on the other of said pair of identical gears; and wherein the gear teeth on said one of said pair of identical gears contact one side of the gear teeth on said first stationary gear at the point of contact between said second planetary gear assembly and said first stationary gear, and the gear teeth of the other of said pair of identical gears contact the other side of the gear teeth on said first stationary gear at said point of contact therebetween.

* * * * *